US006787701B2

(12) United States Patent
Yasuda et al.

(10) Patent No.: US 6,787,701 B2
(45) Date of Patent: Sep. 7, 2004

(54) WATERPROOF GROMMET

(75) Inventors: Noboru Yasuda, Tokyo (JP); Noriaki Sai, Kanagawa (JP)

(73) Assignee: Tyco Electronics, AMP, K.K., Kanagawa (JP)

( * ) Notice: Subject to any disclaimer, the term of this patent is extended or adjusted under 35 U.S.C. 154(b) by 0 days.

(21) Appl. No.: 09/970,570

(22) Filed: Oct. 4, 2001

(65) Prior Publication Data

US 2002/0040802 A1 Apr. 11, 2002

(30) Foreign Application Priority Data

Oct. 6, 2000 (JP) ....................................... 2000-307509

(51) Int. Cl.[7] .................................................. H02G 3/18

(52) U.S. Cl. .............. 174/65 G; 174/65 R; 174/152 G; 16/2.2; 248/56

(58) Field of Search ............................. 174/65 G, 65 R, 174/65 SS, 152 G, 153 G; 248/56; 16/2.1, 2.2

(56) References Cited

U.S. PATENT DOCUMENTS 3,285,551 A * 11/1966 Tschanz ....................... 248/56
4,735,581 A 4/1988 Endo et al. .................. 439/278
5,078,622 A 1/1992 Hunt, III et al. ............ 439/589
5,270,487 A * 12/1993 Sawamura ................ 174/65 G
5,811,728 A * 9/1998 Maeda ...................... 174/65 R

FOREIGN PATENT DOCUMENTS

EP 0 738 025 B1 10/1996 ............ H01R/4/22

* cited by examiner

*Primary Examiner*—Dhiru R Patel

(57) ABSTRACT

The invention relates to a waterproof grommet having a first member (20) and a second member (30). The first member (20) has a first sealing part (22) formed on the inner surface of a through-hole (21) through which an electrical wire connected to a contact is passed. The first sealing part (22) adheres tightly to the electrical wire. The second member (30) has a second sealing part (32) formed on the outer surface of the through-holes (21) that adheres tightly to the connector housing (40). The first member (20) is formed from an elastic material that has a lower hardness than that of the second member (30). As a result, splitting of the inner surface of the through-holes (21) is prevented without causing any deterioration of the waterproof properties of the joint between the connector housing and the waterproof grommet.

21 Claims, 4 Drawing Sheets

WATERPROOF GROMMET

FIELD OF THE INVENTION

The present invention relates to a grommet, and more specifically, to a waterproof grommet assembly for a connector.

BACKGROUND

A conventional waterproof grommet is typically molded from a soft synthetic resin, such as rubber. Synthetic resins have elasticity and have a high degree of adhesion. The characteristics of the resin afford the grommet waterproofing properties and enable the grommet to be compressed so that it can be readily attached to a connector.

The use of a soft synthetic resin, however, is associated with a plurality of drawbacks. For example, when the grommet is compressed for attachment to a connector housing, the through-holes formed in the waterproof grommet are crushed and deformed by the compression causing the through-holes to shift. Further, in the case of a connector that has a plurality of contacts, if the plurality of contacts is inserted into the waterproof grommet in order from one side, a bias pressure is generated in the vicinity of the through-holes containing electrical wires. The pressure causes the through-holes into which electrical wires have not yet been inserted to shift. Because in either case the through-holes no longer correspond with the contact cavities, gaps are created between the waterproof grommet and the inner surface of the connector housing when contacts are inserted, causing the sealing properties of the waterproof grommet to deteriorate.

One method of addressing these drawbacks is shown in Japanese Utility Model Registration No. 2503949 (FIG. 4). This Utility Model discloses a grommet with protruding parts 143 disposed inside a connector housing 140 that engage in recessed parts 123 of the waterproof grommet 111. The assembly prevents the positions of the contact cavities 141 or through-holes 121 from shifting either when a compressive pressure is applied to the grommet or when a plurality of contacts are inserted from one side. Because a soft synthetic resin is used, however, when contacts connected to electrical wires are inserted into the through-holes of the grommet, splitting occurs on the inner surfaces of the through-holes. As a result, water is capable of entering the grommet through the split areas.

It is therefore desirable to develop a waterproof grommet, which reduces the splitting effects of the inner surfaces of the through-holes formed in the waterproof grommet without causing any deterioration of the waterproof properties.

SUMMARY OF THE INVENTION

This invention relates to a waterproof grommet having a first sealing member and a second sealing member. The first member has a first sealing part formed on the inner surface of a through-hole through which an electrical wire connected to a contact is passed. The first sealing part adheres tightly to the electrical wire. The second member has a second sealing part formed on the outer surface of the through-holes that adheres tightly to the connector housing. The first member is formed from an elastic material that has a lower hardness than that of the second member. As a result, splitting of the inner surface of the through-holes is prevented without causing any deterioration of the waterproof properties of the joint between the connector housing and the waterproof grommet.

BRIEF DESCRIPTION OF THE DRAWINGS

The invention will now be described by way of example with reference to the accompanying figures wherein.

DETAILED DESCRIPTION OF THE PREFERRED EMBODIMENT

Figure 1A:
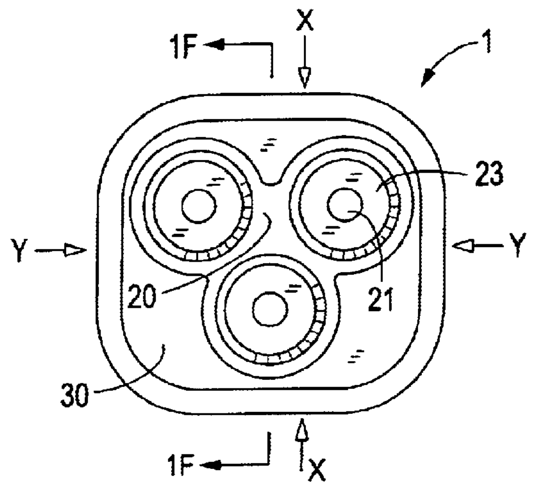
FIG. 1(A) is a front view of the waterproof grommet.
Figure 1D:
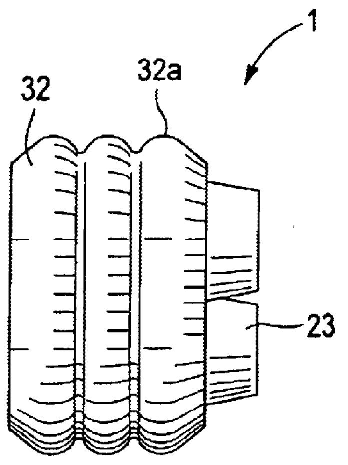
FIG. 1(D) is a left-side view of the waterproof grommet.
Figure 1B:
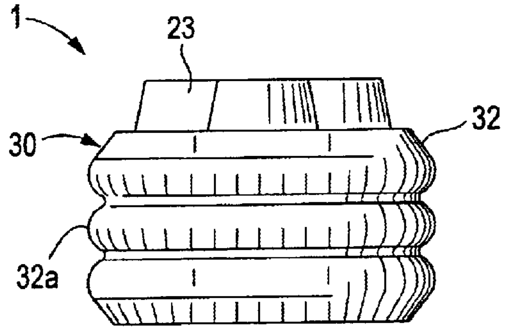
FIG. 1(B) is a bottom view of the waterproof grommet.
Figure 1C:
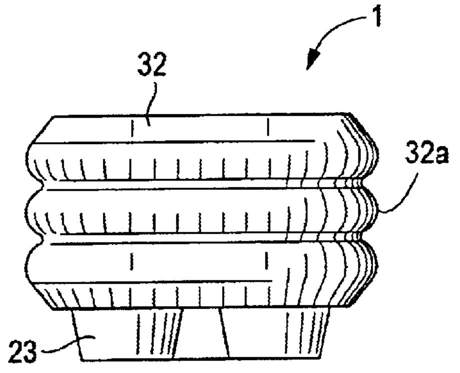
FIG. 1(C) is a plan view of the waterproof grommet.

FIGS. 1(A)–(F), show a waterproof grommet 1 having a substantially rectangular body. The grommet 1 consists of a second member 30 that surrounds a first member 20. The first member 20 is equipped with three through-holes 21 arranged in the shape of an inverted triangle. The through-holes pass through the entire length of the grommet 1 from the front surface to the back surface (the left-right plane in FIG. 1(F)). A first sealing part 22 is disposed on the inner surface of each through-hole 21. The first sealing part 22 has three annular ribs 22*a* that tightly adhere to the corresponding electrical wire. Three protruding parts 23 are used to align the grommet 1 with a connector housing 40. The three protruding parts 23 align the recessed parts 43 that communicate with contact cavities 41 formed in the connector housing 40. The three protruding parts 23 are formed so that the protruding parts 23 project from the front surface in positions corresponding to the respective through-holes 21.

The second member 30 is equipped with a first-member accommodating part 34 that accommodates the first member 20. The second member 30 has a second sealing part 32 with three annular ribs 32*a* on its outer circumferential surface. Three recessed parts 33 are formed on the back surface of the second member 30 and engage with protruding parts 62 formed on a waterproof grommet cap 60. Insertion openings 31 having a tapered shape, are formed coaxially with the first member through-holes 21 and communicate with the through-holes 21 of the first member 20. The second sealing part 32 is disposed so that it adheres tightly to the connector housing 40.

Figure 1E:
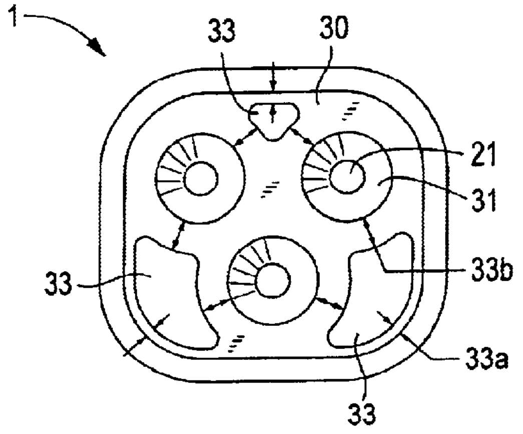
FIG. 1(E) is a back view of the waterproof grommet.
Figure 1F:
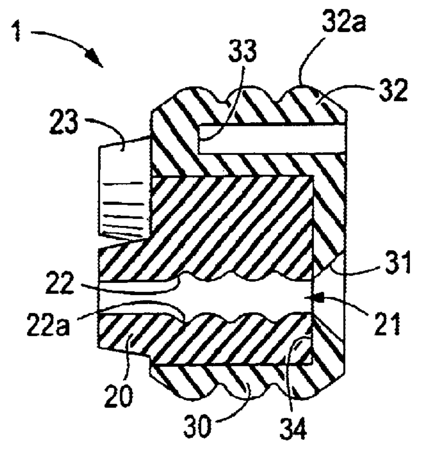
FIG. 1(F) is a sectional view along line 1F—1F of FIG. 1(A).

The three recessed parts 33 with which the protruding parts 62 of the waterproof grommet cap 60 engage are formed so that the distances 33*a* between the recessed parts 33 and the outer circumferential surface are substantially the same (FIG. 1(E)). The distances 33*b* between the recessed parts 33 and the insertion openings 31 are also substantially the same.

The first member 20 is formed from an elastic material that is softer than the material used to form the second member 30. The first member 20 and the second member 30 are preferably formed from silicone rubbers that have different degrees of hardness. Here, a silicon rubber with a hardness of 10 is used for the first member 20. A silicone rubber with a hardness of 50 is used for the second member 30. The first 20 and second 30 members are formed as an integral unit by two-color molding.

Figure 2A:
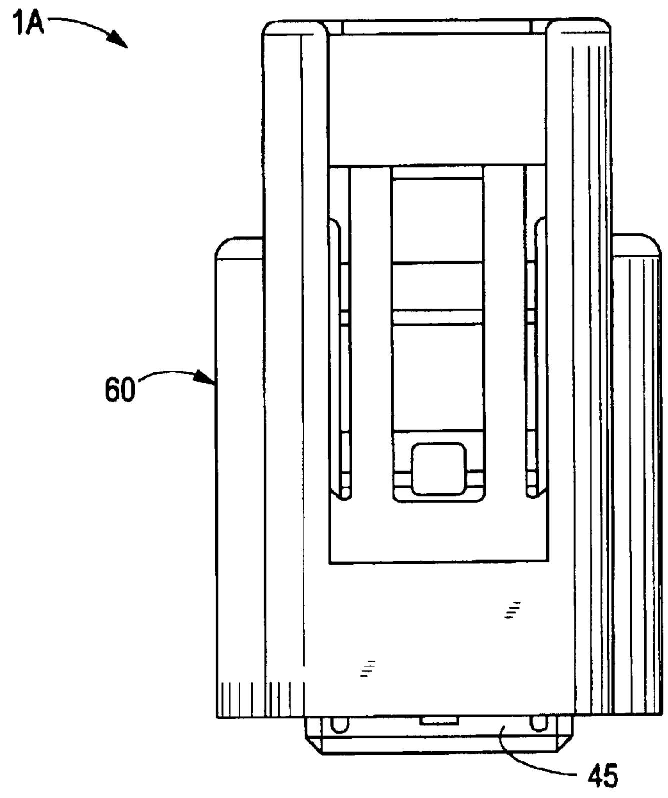
FIG. 2(A) is a plan view of the waterproof grommet attached to the connector.
Figure 2B:
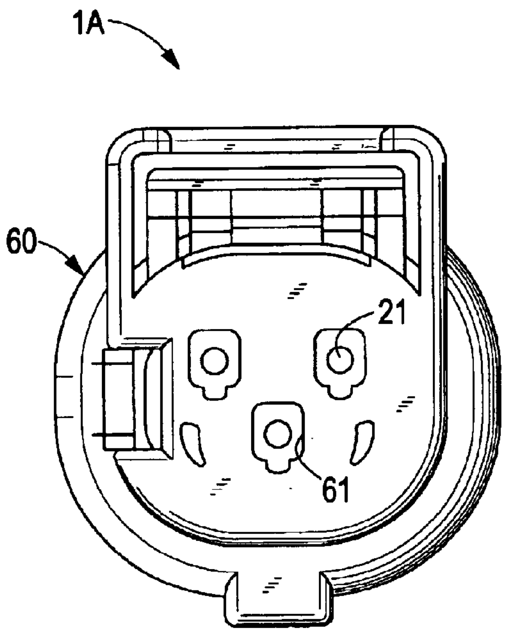
FIG. 2(B) is a back view of the waterproof grommet attached to the connector.
Figure 2C:
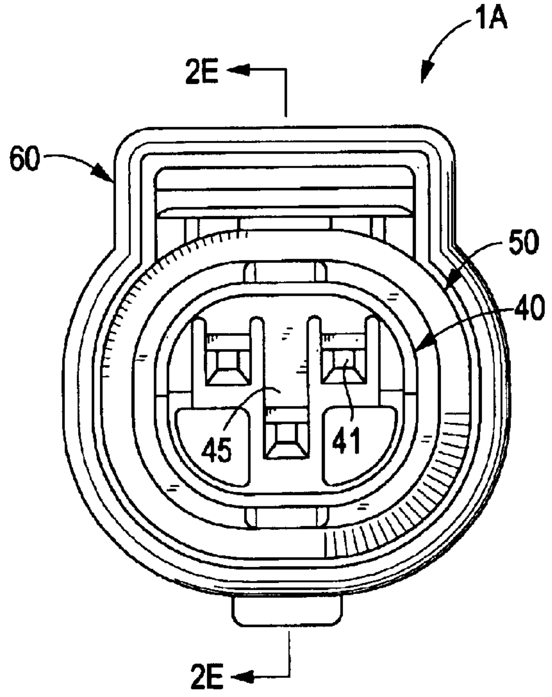
FIG. 2(C) is a front view of the waterproof grommet attached to the connector.
Figure 2D:
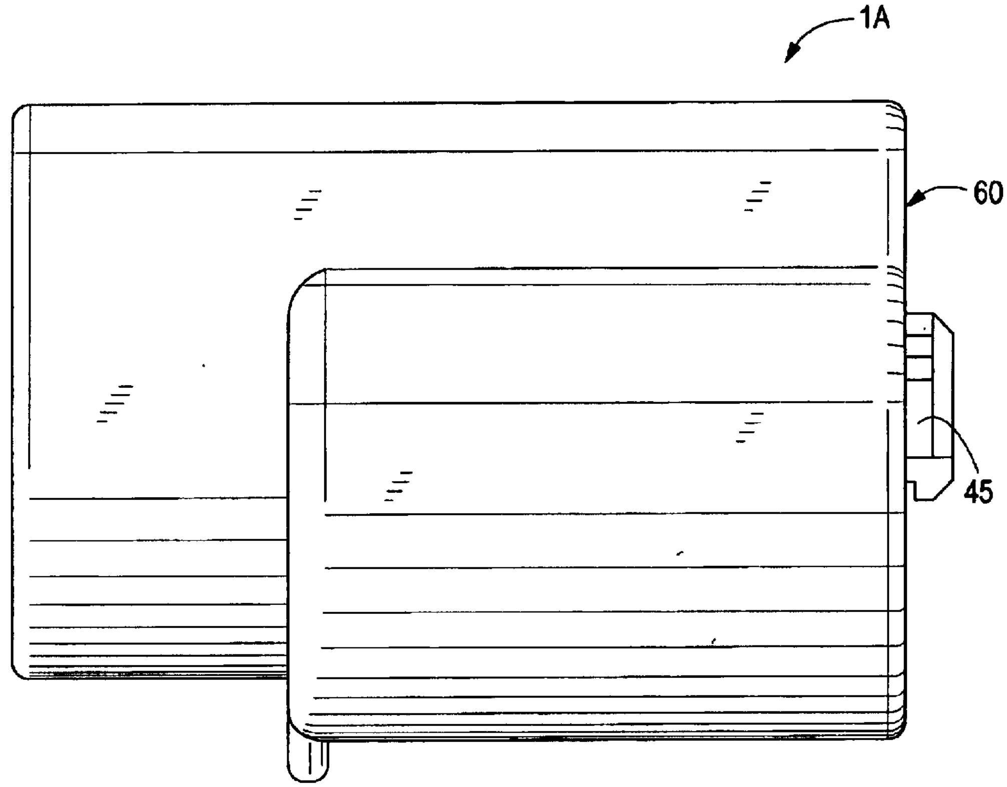
FIG. 2(D) is a left-side view of the waterproof grommet attached to the connector.
Figure 2E:
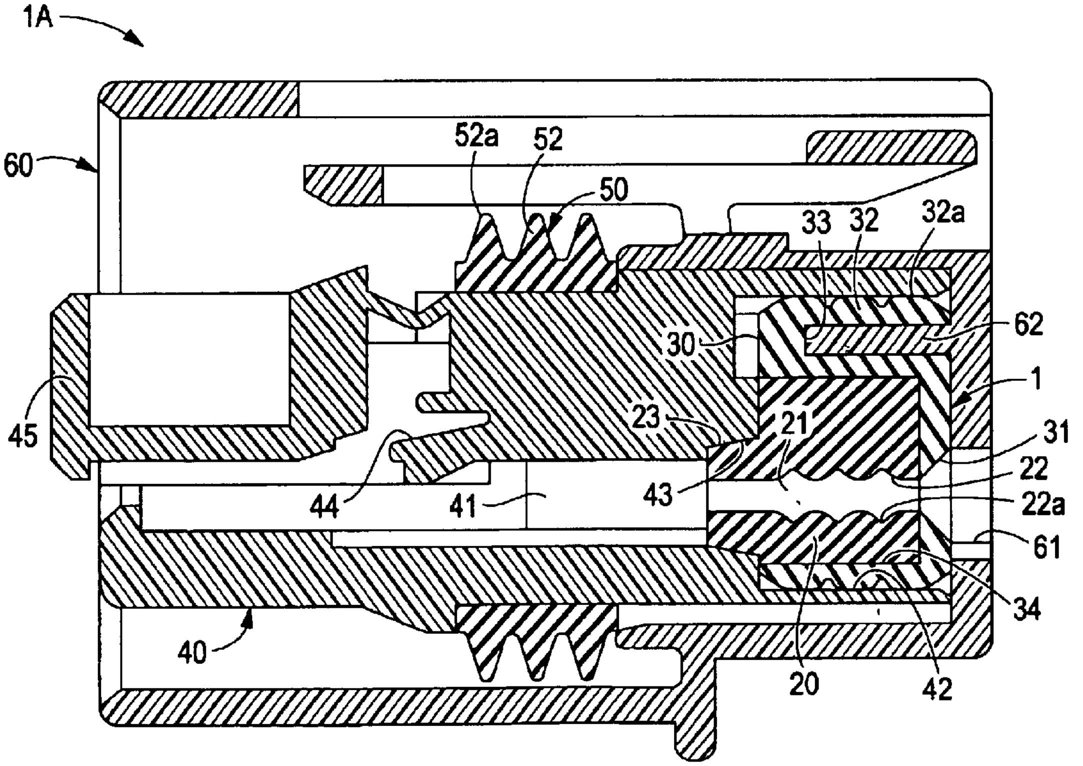
FIG. 2(E) is a sectional view along line 2E—2E of FIG. 2(D).
Figure 3:
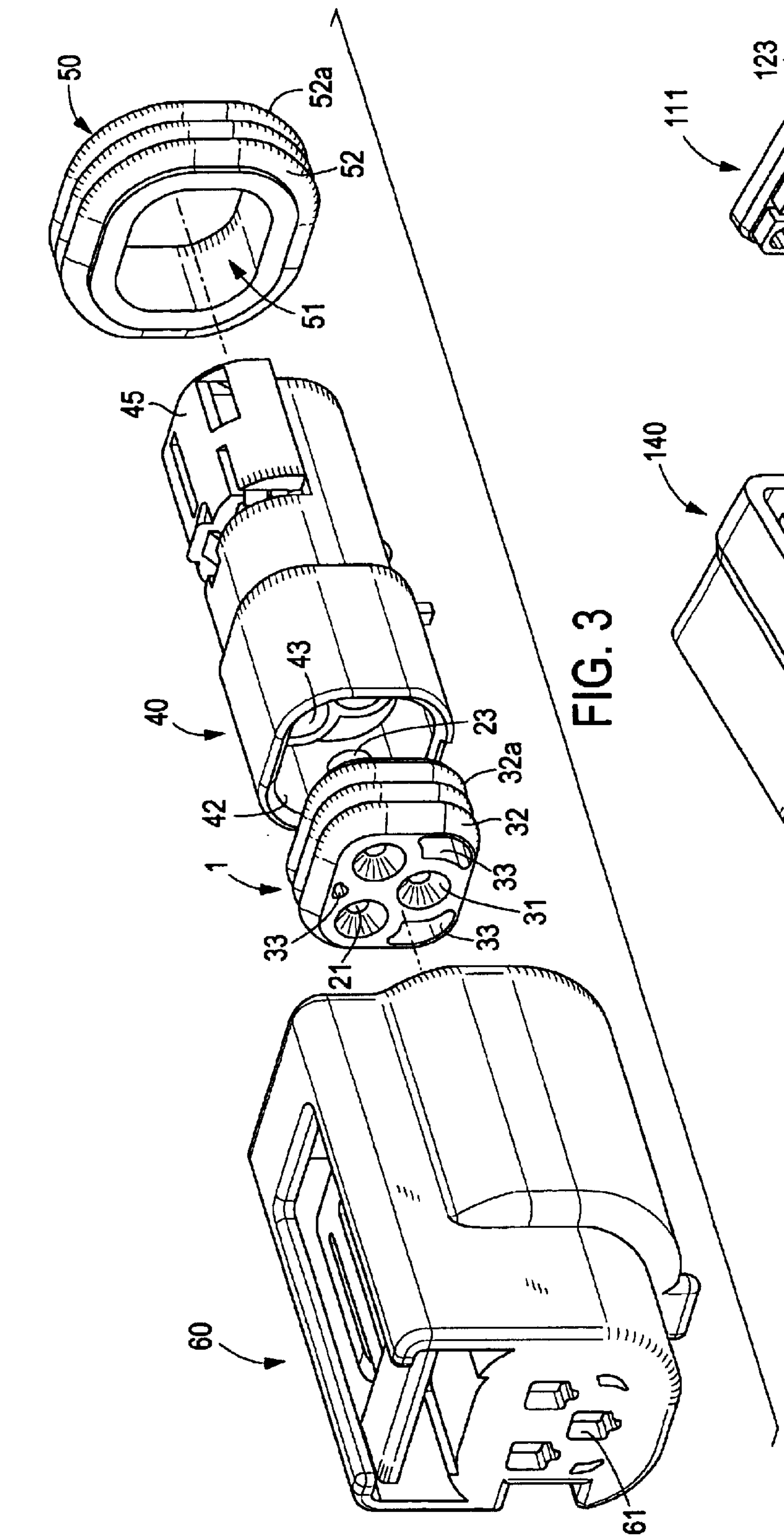
FIG. 3 is an exploded perspective view of a method of assembly of the connector using the waterproof grommet.
Figure 4:
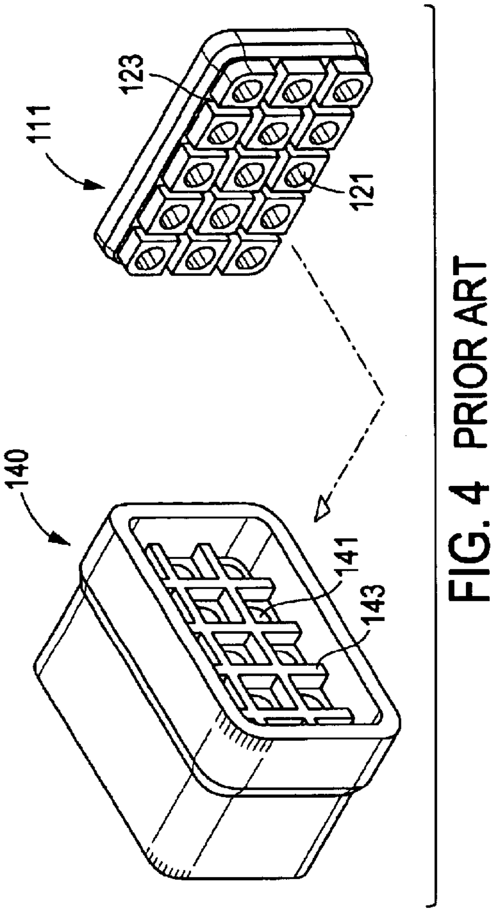
FIG. 4 PRIOR ART
FIG. 4 is a perspective view of a connector using a conventional waterproof grommet.

The connector housing 40 has a tubular shape (FIG. 3 and FIG. 2(E)). The housing 40 is equipped with three contact cavities 41. Disposed on the back surfaces of the contact cavities 41 is an engaging part 42 used to engage the waterproof grommet 1. Elastic lances 44 are formed inside the respective contact cavities 41 and anchor the contacts. A retainer 45 restricts the movement of the elastic lances 44 after the elastic lances 44 have anchored the contacts. The engaging part 42 has recessed parts 43 formed on the back surfaces of the contact cavities 41 used for alignment with the waterproof grommet 1.

The waterproof grommet cap 60 is separate from the connector housing 40 (FIG. 2(E) and FIG. 3). The grommet cap 60 functions as a waterproof grommet supporting member and has a tubular shape which allows insertion and engagement from the front of the connector housing 40 on which the waterproof grommet 1 and sealing ring 50 are mounted. The grommet cap 60 has three protruding parts 62 that align the through-holes 21 of the grommet 1 and the contact cavities 41 by entering the recessed parts 33 of the waterproof grommet 1.

Alternatively, the protruding parts 62 may be disposed on the front surface of the engaging part 42 of the connector housing 40 and used as waterproof grommet supporting members. In this case, the recessed parts 33 into which the protruding parts 62 are inserted are formed from the front surface of the second member 30 of the waterproof grommet 1. The recessed parts 33 that engage with the protruding parts 62 are formed so that the distances 33*a* between the recessed parts 33 and the outer circumferential surface are substantially the same, and so that the distances 33*b* between the recessed parts 33 and the insertion openings 31 are substantially the same. Accordingly, the compression margin of the second member 30 in a state in which this member is mounted in the connector housing 40 and electrical wires are passed through is made uniform, so that the waterproof properties can be improved.

Three electrical wire through-holes 61 are formed in the grommet cap 60 corresponding to the through-holes 21 formed in the grommet 1. Electrical wire, connected to contacts, passes through the through-holes 61. The sealing ring 50 has a sealing part 52 that is equipped with three annular ribs 52*a*. The ribs 52*a* prevent the invasion of water through the gap present between the housing 40 and a mating connector (not shown).

Hereafter, the method used to manufacture the connector 1A using the waterproof grommet 1 will be described (FIG. 2).

First, the waterproof grommet 1 is inserted and engaged with the engaging part 42 from the rear of the connector housing 40 (FIG. 3). A compressive force is applied to the waterproof grommet 1 in the X and Y directions (FIG. 1(A)). The compressive force causes the protruding parts 23 to project from the front surface of the waterproof grommet 1. The protruding parts 23 are inserted and engaged in the recessed parts 43 that are formed so that the recessed parts 43 communicate with the contact cavities 41 of the connector housing 40 (FIG. 3). The annular ribs 32*a* of the second sealing part 32 formed on the outer circumferential surface of the waterproof grommet 1 are elastically pressed against the inner circumferential surface of the engaging part 42 of the connector housing 40, preventing the invasion of water into the housing 40.

The connector housing 40 is then passed through the central hole 51 of the sealing ring 50 from the rear side and mounted. The protruding parts 62 formed on the grommet cap 60 are inserted and engaged in the recessed parts 33 formed in the rear surface of the waterproof grommet 1 (FIG. 3), aligning the contact cavities 41 with the through-holes 21. In a case where the protruding parts 62 are disposed on the engaging part 42 of the connector housing 40 and used as waterproof grommet supporting members, the protruding parts 62 and recessed parts 33 formed in the front surface of the second member 30 are engaged when the waterproof grommet 1 is inserted and engaged in the engaging part 42 from the rear of the connector housing 40.

Since the three recessed parts 33 are formed so that the distances 33*a* between the recessed parts 33 and the outer circumferential surface are substantially the same, the thicknesses between the recessed parts 33 and the outer circumferential surface are compressed by substantially the same amount. Because the compression margin of these thicknesses is made uniform, the waterproof properties of the joint between the connector housing 40 and waterproof grommet 1 are greatly improved.

Three electrical wires connected to contacts are then inserted via the electrical wire through-holes 61 formed in the rear surface of the grommet cap 60. The contacts are inserted into the contact cavities 41 of the connector housing 40. The annular ribs 22*a* of the first sealing parts 22 formed on the inner surfaces of the through-holes 21 of the waterproof grommet 1 are elastically pressed against the outer surfaces of the electrical wires. Since the three recessed parts 33 in the waterproof grommet 1 are formed so that the distances 33*b* between the recessed parts 33 and the insertion openings 31 are substantially the same, the thicknesses between the recessed parts 33 and the insertion openings 31 are compressed more or less uniformly. Thus, the compression margin of the thicknesses is made uniform. As a result, the waterproof properties of the joints between the electrical wires and the waterproof grommet 1 are greatly improved.

The shoulder parts (not shown) of the contacts are anchored by the elastic lances 44 formed in the connector housing 40. The retainer 45 is positioned above the elastic lances 44, anchoring the contacts in the connector housing 40. The mating connector (not shown) is connected from the front of the connector housing 40 (the left direction in FIG. 2(E)). Thus, invasion by water via the gap that exists between the connector housing 40 and the mating connector is prevented by the annular ribs 52*a* of the sealing part 52 of the sealing ring 50.

While the present invention has been described in connection with the illustrated embodiments, it will be appreciated and understood that modifications may be made without departing from the true spirit and scope of the invention. For example, the number of through-holes, annular ribs, and recessed parts may be adjusted as required by alternative embodiments. Further, an array of elastic materials with varying degrees of hardness may be used to form the first and second members.

What is claimed is:

1. A waterproof grommet comprising:

a first member having a first sealing part formed on the inner surface of at least one through-hole through which an electrical wire that connects a contact is passed, and which can adhere tightly to the electrical wire;

a second member having a second sealing part which is formed on the outer circumferential surface of the through-hole, and which can adhere tightly to a connector housing; and the first and second member are formed from an elastic material, the elastic material of the first member having the first sealing part is formed from an elastic material that has a lower hardness than the elastic material of the second member having the second sealing part to prevent splitting on the inner surface of the through-hole when the electrical wire is passed therethrough.

2. The waterproof grommet of claim 1 wherein the second member has an insertion opening with a tapered shape and is disposed at the insertion entry point for the contact in the through-hole.

3. The waterproof grommet of claim 2 wherein the first member and the second member are formed as an integral unit by two-color molding.

4. The waterproof grommet of claim 1 wherein the first member and the second member are formed as an integral unit by two-color molding.

5. The waterproof grommet of claim 1 wherein the second member has recessed parts used to align a contact cavity formed in the connector housing with the through-hole by engaging with protruding parts formed on a waterproof grommet supporting member; and the recessed parts are formed so that the distances between the recessed parts and the outer circumferential surface are substantially the same, and so that the distances between the recessed parts and the through-holes are substantially the same.

6. The waterproof grommet of claim 5 wherein the waterproof grommet supporting member is a waterproof grommet cap that is separate from the connector housing.

7. The waterproof grommet of claim 1, wherein the first and second members are made from silicone rubber.

8. The waterproof grommet of claim 7, wherein the silicone rubber of the first member has a hardness of approximately 10 and the silicone rubber of the second member has a hardness of approximately 50.

9. The waterproof grommet of claim 1, wherein the first sealing part and the second sealing part include ribs.

10. The waterproof grommet of claim 1, wherein the second member has at least one recessed part which is used to align a contact cavity formed in the connector housing with the through-hole by engaging with at least one protruding part formed on a supporting member.

11. The waterproof grommet of claim 1, wherein the second member has at least one recessed part that engages a protruding part formed on the connector housing so that the second member has a uniform compression margin when the electrical wire is received in the through-hole.

12. The waterproof grommet of claim 11, wherein the recessed parts are formed: so that the distance between the recessed parts and the outer circumferential surface are essentially the same and so that the distances between the recessed parts and the through-hole are substantially the same.

13. A waterproof grommet comprising:

a first member having a first sealing part formed on the inner surface of at least one through-hole through which an electrical wire that connects to a contact is passed, the first sealing part being formed to adhere tightly to the electrical wire;

a second member having a second sealing part formed on the outer circumferential surface of the through-hole, the second sealing part being formed to adhere tightly to a connector housing;

the first member having the first sealing part is formed from an elastic material that has a lower hardness than the hardness of the second member having the second sealing part;

the first member and the second member are formed as an integral unit by two-color molding;

the second member has at least one recessed part which is used to align a contact cavity formed in the connector housing with the through-hole by engaging with at least one protruding part formed on a waterproof grommet supporting member; and the recessed part(s) are formed so that the distances between the recessed part(s) and the outer circumferential surface of the through-hole(s) are substantially the same, and so that the distances between the recessed part(s) and the through-hole(s) are substantially the same.

14. The waterproof grommet of claim 13 wherein the waterproof grommet supporting member is a waterproof grommet cap that is separate from the connector housing.

15. A waterproof grommet comprising:

a first member having a first sealing part formed on the inner surface of at least one through-hole through which an electrical wire that connects to a contact is passed, the first sealing part being formed to adhere tightly to the electrical wire;

a second member having a second sealing part formed on the outer circumferential surface of the through-hole, the second sealing part being formed to adhere tightly to a connector housing;

the first member having the first sealing part formed from an elastic material that has a lower hardness than the hardness of the second member having the second sealing part;

the second member having an insertion opening with a tapered shape and disposed at the insertion entry point for the contact in the through-hole, and has at least one recessed part which is used to align a contact cavity formed in the connector housing with the through-hole by engaging with at least one protruding part formed on a waterproof grommet supporting member; and the recessed part(s) are formed so that the distances between the recessed part(s) and the outer circumferential surface of the through-hole(s) are substantially the same, and so that the distances between the recessed part(s) and the through-hole(s) are substantially the same.

16. The waterproof grommet of claim 15 wherein the first member and the second member are formed as an integral unit by two-color molding.

17. The waterproof grommet of claim 16 wherein the waterproof grommet supporting member is a waterproof grommet cap that is separate from the connector housing.

18. The waterproof grommet of claim 15 wherein the waterproof grommet supporting member is a waterproof grommet cap that is separate from the connector housing.

19. A waterproof grommet assembly, comprising:

a first member having a first sealing part formed on an inner surface of a through-hole that sealingly engages an electrical wire received in the through-hole;

a second member having a recessed part for receipt of a protrusion formed on a supporting member and a second sealing part formed on an outer circumferential surface of the through-hole that sealingly engages a housing.

20. The waterproof grommet assembly of claim 19, wherein the supporting member is an engaging part on the housing.

21. The waterproof grommet assembly of claim 19, wherein the supporting member is a waterproof grommet cap that is separate from the housing.

* * * * *